(12) United States Patent
Sugawara

(10) Patent No.: US 10,277,814 B2
(45) Date of Patent: Apr. 30, 2019

(54) DISPLAY CONTROL METHOD AND SYSTEM FOR EXECUTING THE DISPLAY CONTROL METHOD

(71) Applicant: COLOPL, INC., Tokyo (JP)

(72) Inventor: Kenta Sugawara, Tokyo (JP)

(73) Assignee: COLOPL, INC., Tokyo (JP)

( * ) Notice: Subject to any disclaimer, the term of this patent is extended or adjusted under 35 U.S.C. 154(b) by 14 days.

(21) Appl. No.: 15/679,122

(22) Filed: Aug. 16, 2017

(65) Prior Publication Data

US 2018/0054568 A1 Feb. 22, 2018

(30) Foreign Application Priority Data

Aug. 17, 2016 (JP) ................. 2016-160084

(51) Int. Cl.
*G09G 5/00* (2006.01)
*H04N 5/232* (2006.01)
(Continued)

(52) U.S. Cl.
CPC ..... *H04N 5/23238* (2013.01); *G02B 27/0093* (2013.01); *G02B 27/017* (2013.01);
(Continued)

(58) Field of Classification Search
CPC ............ H04N 5/23238; G02B 27/0093; G02B 27/017; G02B 27/0172; G06F 1/163; G06F 3/011; G06F 3/012
(Continued)

(56) References Cited

U.S. PATENT DOCUMENTS

2003/0126035 A1 7/2003 Kake et al.
2014/0186002 A1 7/2014 Hanaya et al.
(Continued)

FOREIGN PATENT DOCUMENTS

JP 10-240213 A 9/1998
JP 2003-248844 A 9/2003
(Continued)

OTHER PUBLICATIONS

Office Action in JP Application No. 2016-160084, dated Feb. 14, 2017, 6 pp.

*Primary Examiner* — Sarah Lhymn
(74) *Attorney, Agent, or Firm* — Hauptman Ham, LLP

(57) ABSTRACT

A display control method includes generating first virtual space data defining a first virtual space including a first virtual camera and a display object. The method includes displaying a first visual-field image on a head-mounted display based on a visual field of the first virtual camera and the first virtual space data. The method includes updating the first visual-field image by moving the first virtual camera in synchronization with detected movement of the head-mounted display. The method includes generating second virtual space data for defining a second virtual space including a second virtual camera. The method includes displaying a second visual-field image on the display object based on a visual field of the second virtual camera and the second virtual space data. The method includes updating the second visual-field image by moving the second virtual camera in the second virtual space in synchronization with the detected movement.

20 Claims, 9 Drawing Sheets

(51) Int. Cl.
  *G02B 27/01* (2006.01)
  *G06F 3/01* (2006.01)
  *G02B 27/00* (2006.01)
  *G06F 1/16* (2006.01)

(52) U.S. Cl.
  CPC ......... *G02B 27/0172* (2013.01); *G06F 1/163* (2013.01); *G06F 3/011* (2013.01); *G06F 3/012* (2013.01); *G09G 5/00* (2013.01); *G02B 2027/014* (2013.01)

(58) Field of Classification Search
  USPC .......................................... 345/619, 632, 633
  See application file for complete search history.

(56) References Cited

U.S. PATENT DOCUMENTS

| | | | |
|---|---|---|---|
| 2015/0352437 A1* | 12/2015 | Koseki | A63F 13/212 463/31 |
| 2016/0246061 A1* | 8/2016 | Bickerstaff | G06F 3/012 |
| 2017/0053452 A1 | 2/2017 | Arai | |
| 2017/0059871 A1* | 3/2017 | Hashiba | G02B 27/0179 |

FOREIGN PATENT DOCUMENTS

| | | |
|---|---|---|
| JP | 2007-86716 A | 4/2007 |
| JP | 2014-127987 A | 7/2014 |
| JP | 5882517 B1 | 3/2016 |
| JP | 5914739 B1 | 5/2016 |
| JP | 5961736 B1 | 8/2016 |

* cited by examiner

DISPLAY CONTROL METHOD AND SYSTEM FOR EXECUTING THE DISPLAY CONTROL METHOD

RELATED APPLICATIONS

The present application claims priority to Japanese Patent Application No. 2016-160084, filed Aug. 17, 2016, the disclosure of which is hereby incorporated by reference herein in its entirety

TECHNICAL FIELD

This disclosure relates to a display control method and a system for executing the display control method.

BACKGROUND

In Patent Document 1, there is disclosed a method involving displaying, in a virtual space, a signboard on which an advertisement or other notices are displayed by changing a display position and a display direction thereof so that a user can easily recognize the signboard.

PATENT DOCUMENTS

[Patent Document 1] Japanese Patent Application Laid-open No. 2003-248844

SUMMARY

There is known a head-mounted display (HMD), which is worn on a head of a user and capable of displaying a virtual space image as a virtual space such as a virtual reality (VR) space or an augmented reality (AR) space. In Patent Document 1, details of how the advertisement is displayed on the signboard are not disclosed.

Further, in the virtual space, for example, a 360-degree panorama video is provided as an advertisement. Hitherto, there has been known a technology of rendering an image photographed by a camera (sub-camera), which is different from a virtual camera for providing a visual field of the user, into an object in the virtual space. However, even when a video advertisement is placed on an object in the virtual space with this technology, a thumbnail of the video advertisement is simply displayed on the object on a plane surface (two-dimensionally), and thus the user cannot easily grasp whether or not the image is a 360-degree panorama video advertisement.

At least one embodiment of this disclosure has an object to help to provide a display control method enabling a user to easily recognize the fact that there is an appealing video, for example, a 360-degree panorama video, in a visual field. Further, in at least one embodiment of this disclosure has an object to provide a system for executing the display control method.

According to at least one embodiment of this disclosure, there is provided a display control method for execution by a system including a head-mounted display. The display control method includes generating first virtual space data for defining a first virtual space including a first virtual camera and a display object. The method further includes displaying a first visual-field image on the head-mounted display based on a visual field of the first virtual camera and the first virtual space data. The method further includes updating the first visual-field image by moving the first virtual camera in the first virtual space in synchronization with movement of the head-mounted display. The method further includes generating second virtual space data for defining a second virtual space including a second virtual camera. The method further includes displaying a second visual-field image on the display object based on a visual field of the second virtual camera and the second virtual space data. The method further includes updating the second visual-field image by moving the second virtual camera in the second virtual space in synchronization with movement of the head-mounted display.

Further, according to at least one embodiment of this disclosure, there is provided a display control method, which is executed by a system including a head-mounted display. The display control method includes generating first virtual space data for defining a first virtual space including a first virtual camera and a display object. The method further includes displaying a first visual-field image on the head-mounted display based on a visual field of the first virtual camera and the first virtual space data. The method further includes updating the first visual-field image by moving the first virtual camera in the first virtual space in synchronization with movement of the head-mounted display. The method further includes displaying a second visual-field image different from the first visual-field image on the display object in a manner that enables grasp of a fact that the second visual-field image is a 360-degree panorama video.

According to this disclosure, the display control method enables the user to easily recognize the fact that there is an appealing video, for example, a 360-degree panorama video, in the visual field.

DETAILED DESCRIPTION

Figure 1:
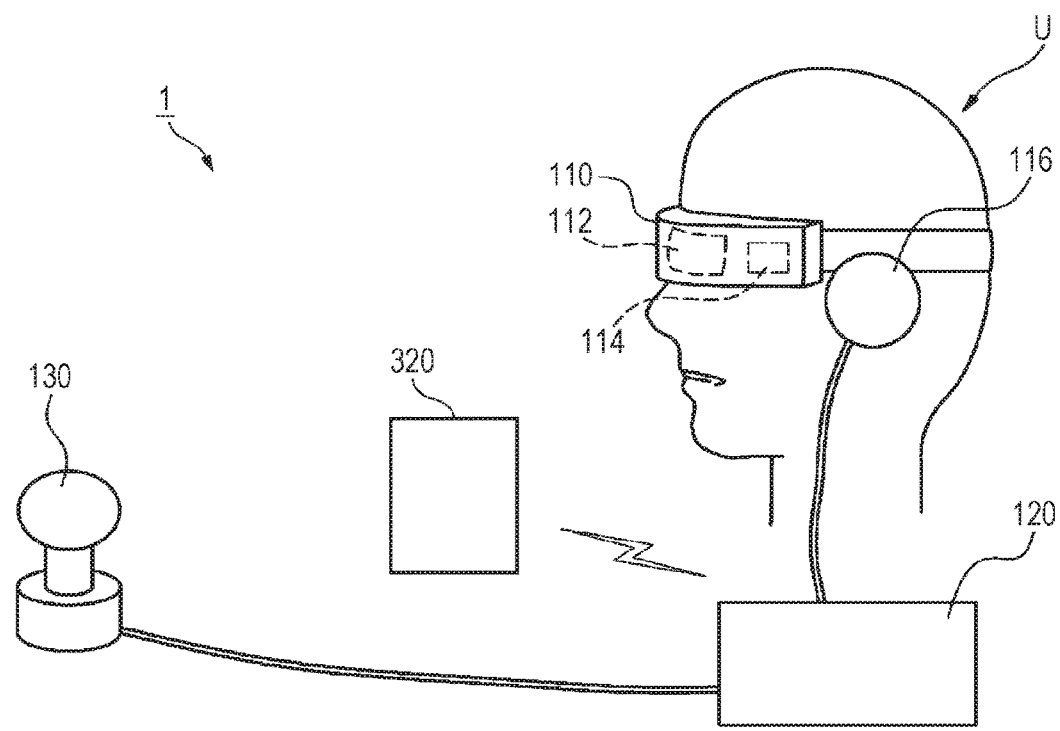
FIG. 1 A schematic diagram of a head-mounted display (HMD) system according to at least one embodiment of this disclosure.

Now, a description is given of an outline of at least one embodiment of this disclosure.

(1) A display control method, which is executed by a system including a head-mounted display. The display control method includes generating first virtual space data for defining a first virtual space including a first virtual camera and a display object. The method further includes displaying a first visual-field image on the head-mounted display based on a visual field of the first virtual camera and the first virtual space data. The method further includes updating the first visual-field image by moving the first virtual camera in the first virtual space in synchronization with movement of the head-mounted display. The method further includes generating second virtual space data for defining a second virtual space including a second virtual camera. The method further includes displaying a second visual-field image on the display object based on a visual field of the second virtual camera and the second virtual space data. The method further includes updating the second visual-field image by moving the second virtual camera in the second virtual space in synchronization with movement of the head-mounted display.

According to the method described above, the user is able to easily recognize the fact that there is an appealing video, for example, a 360-degree panorama video, in the visual field.

(2) In at least one embodiment, the method further includes starting display of the second visual-field image on the display object when the display object enters the visual field of the first virtual camera.

According to the method described above, a data processing load is reduced by reproducing the second visual-field image, which is a 360-degree panorama video, only when the user can recognize the monitor object.

(3) In at least one embodiment, generating the second virtual space data includes defining a front direction of the visual field of the second virtual camera in the second visual-field image displayed on the display object when the display object enters the visual field of the first virtual camera.

According to the method described above, the 360-degree panorama video is made more appealing by, for example, starting reproduction of the 360-degree panorama video on the monitor object from the front direction of the video.

(4) A display control method, which is executed by a system including a head-mounted display. The display control method includes generating first virtual space data for defining a first virtual space including a first virtual camera and a display object. The method further includes displaying a first visual-field image on the head-mounted display based on a visual field of the first virtual camera and the first virtual space data. The method further includes updating the first visual-field image by moving the first virtual camera in the first virtual space in synchronization with movement of the head-mounted display. The method further includes displaying a second visual-field image different from the first visual-field image on the display object in a manner that enables grasp of a fact that the second visual-field image is a 360-degree panorama video.

According to the method described above, the user can easily recognize the fact that there is a 360-degree panorama video in the visual field.

(5) A system for executing the display control method of any one of Items (1) to (4).

According to this configuration, the system enables the user to easily recognize the fact that there is an appealing video, for example, a 360-degree panorama video, in the visual field.

At least one embodiment of this disclosure is described below with reference to the drawings. Once a component is described in this description of the embodiment, a description on a component having the same reference number as that of the already described component is omitted for the sake of convenience.

FIG. 1 is a schematic diagram of a head-mounted display (hereinafter simply referred to as "HMD") system 1, which enables the display control method according to at least one embodiment of this disclosure (hereinafter simply referred to as "this embodiment"). In FIG. 1, the HMD system 1 includes an HMD 110 worn on a head of a user U, a position sensor 130, a control device 120, and an external controller 320.

The HMD 110 includes a display unit 112, an HMD sensor 114, and headphones 116.

The display unit 112 includes a non-transmissive display device configured to cover a field of view (visual field) of the user U wearing the HMD 110. In at least one embodiment, the HMD 110 includes a transmissive display device, and the HMD 110 may be configured as a temporarily non-transmissive display device through adjustment of a transmittance of the transmissive display device. With this, the user U can see only a visual-field image displayed on the display unit 112, and hence the user U can be immersed in the virtual space. The display unit 112 may include a left-eye display unit for projecting an image to a left eye of the user U, and a right-eye display unit for projecting an image to a right eye of the user U.

The HMD sensor 114 is mounted near the display unit 112 of the HMD 110. The HMD sensor 114 includes at least one of a geomagnetic sensor, an acceleration sensor, or an inclination sensor (e.g., angular velocity sensor or gyro sensor), and can detect various movements of the HMD 110 worn on the head of the user U.

The headphones 116 are worn on the left ear and right ear of the user U, respectively. The headphones 116 are configured to receive sound data (electric signal) from the control device 120, and output sound based on the received sound data. Sound to be output to a right-ear speaker of the headphones 116 may be different from sound to be output to a left-ear speaker of the headphones 116. For example, the control device 120 may acquire sound data to be input to the right-ear speaker and sound data to be input to the left-ear speaker based on a head-related transfer function, and output those two different pieces of sound data to the left-ear speaker and right-ear speaker of the headphones 116, respectively. Speakers (e.g., two installed speakers) and earphones independent of the HMD 110 may be provided without providing the headphones 116 to the HMD 110.

The position sensor 130 is constructed of, for example, a position tracking camera, and is configured to detect the positions of the HMD 110. The position sensor 130 is connected to the control device 120 so as to enable communication to/from the control device 120 in a wireless or wired manner. The position sensor 130 is configured to detect information relating to positions, inclinations, or light emitting intensities of a plurality of detection points (not shown) provided in the HMD 110. Further, the position sensor 130 may include an infrared sensor or a plurality of optical cameras.

The control device 120 is capable of acquiring information of the position of the HMD 110 based on the information acquired from the position sensor 130, and accurately associating the position of the virtual camera in the virtual space with the position of the user U wearing the HMD 110 in the real space based on the acquired information of the position of the HMD 110.

Figure 2:
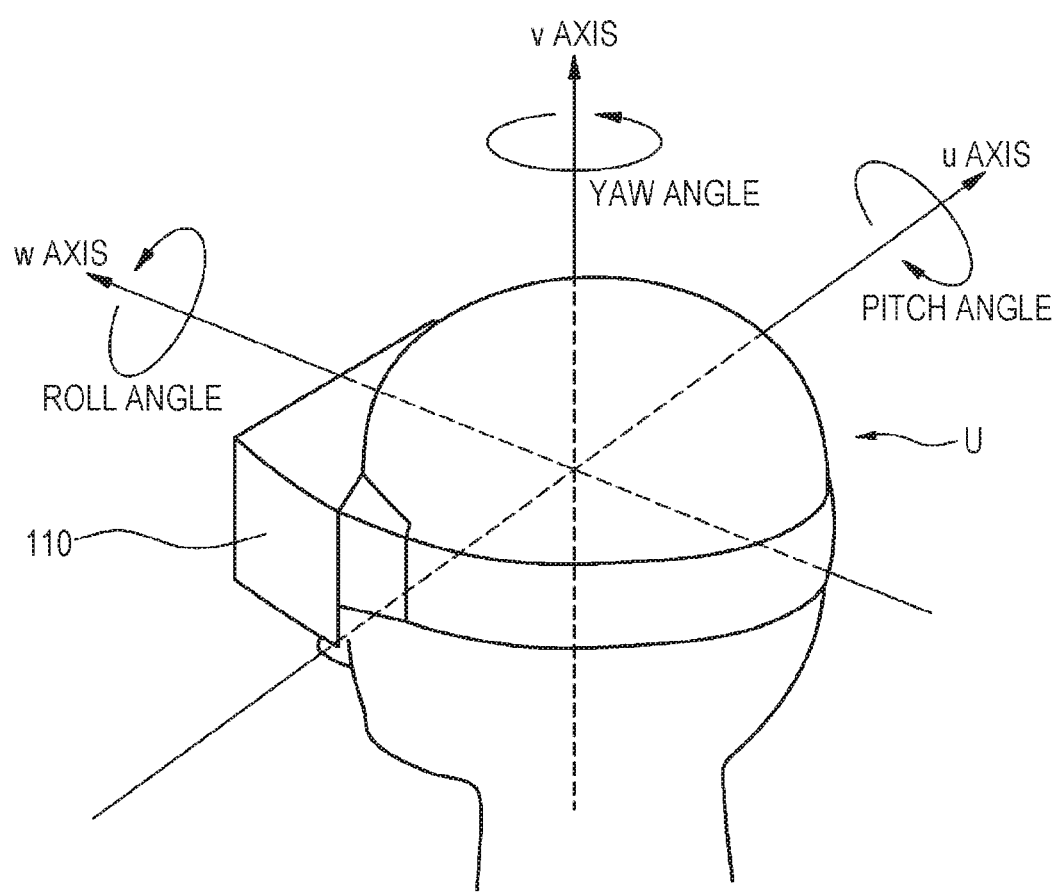
FIG. 2 A diagram of a head of a user wearing the HMD according to at least one embodiment of this disclosure.

Next, with reference to FIG. 2, a method of acquiring information relating to a position and an inclination of the HMD 110 is described. FIG. 2 is a diagram of the head of the user U wearing the HMD 110 according to at least one embodiment of this disclosure. The information relating to the position and the inclination of the HMD 110, which are synchronized with the movement of the head of the user U wearing the HMD 110, can be detected by the position sensor 130 and/or the HMD sensor 114 mounted on the HMD 110. In FIG. 2, three-dimensional coordinates (uvw coordinates) are defined about the head of the user U wearing the HMD 110. A perpendicular direction in which the user U stands upright is defined as a v axis, a direction being orthogonal to the v axis and connecting the center of the display unit 112 and the user U is defined as a w axis, and a direction orthogonal to the v axis and the w axis is defined as a u axis. The position sensor 130 and/or the HMD sensor 114 are/is configured to detect angles about the respective uvw axes (that is, inclinations determined by a yaw angle representing the rotation about the v axis, a pitch angle representing the rotation about the u axis, and a roll angle representing the rotation about the w axis). The control device 120 determines angular information for controlling a visual axis of the virtual camera, which is configured to define visual-field information, based on the detected change in angles about the respective uvw axes.

Figure 3:
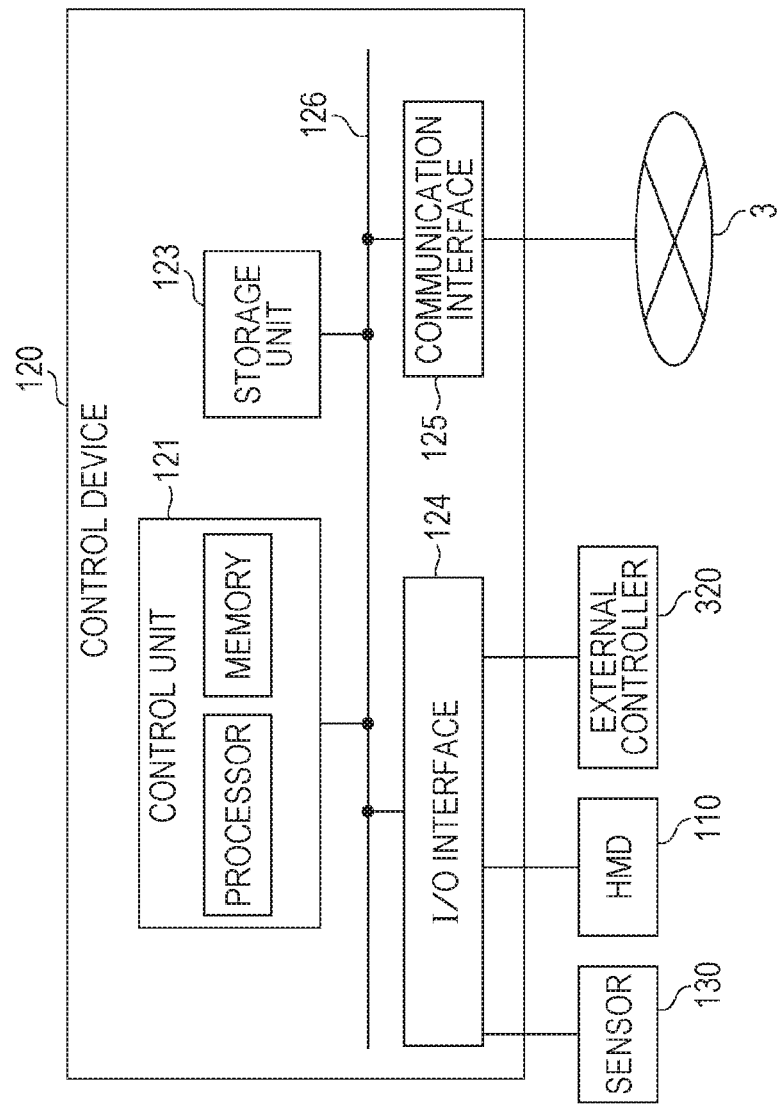
FIG. 3 A diagram of a hardware configuration of a control device according to at least one embodiment of this disclosure.

Next, with reference to FIG. 3, a hardware configuration of the control device 120 is described. In FIG. 3, the control device 120 includes a control unit 121, a storage unit 123, an input/output (I/O) interface 124, a communication interface 125, and a bus 126. The control unit 121, the storage unit 123, the I/O interface 124, and the communication interface 125 are connected to each other via the bus 126 so as to enable communication therebetween.

The control device 120 may be constructed as a personal computer, a tablet computer, or a wearable device separately from the HMD 110, or may be built into the HMD 110. Further, a part of the functions of the control device 120 may be executed by a device mounted to the HMD 110, and other functions of the control device 120 may be executed by another device separate from the HMD 110.

The control unit 121 includes a memory and a processor. The memory is constructed of, for example, a read only memory (ROM) having various programs and the like stored therein and a random access memory (RAM) having a plurality of work areas in which various programs to be executed by the processor are stored. The processor is constructed of, for example, a central processing unit (CPU), a micro processing unit (MPU) and/or a graphics processing unit (GPU), and is configured to load, on the RAM, programs designated by various programs installed into the ROM to execute various types of processing in cooperation with the RAM.

In particular, the control unit 121 may control various operations of the control device 120 by causing the processor to load, on the RAM, a display control program (to be described later) for executing the display control method according to at least one embodiment on a computer to execute the program in cooperation with the RAM. The control unit 121 executes a predetermined application (e.g., game program) stored in the memory or the storage unit 123 to provide a visual-field image corresponding to at least a part of the virtual space on the display unit 112 of the HMD 110. With this, the user U can be immersed in the virtual space provided on the display unit 112.

The storage unit (storage) 123 is a storage device, for example, a hard disk drive (HDD), a solid state drive (SSD), or a USB flash memory, and is configured to store programs and various types of data. The display control program may be incorporated in the storage unit 123. Further, the storage unit 123 may store programs for authentication of the user and game programs including data relating to various images and objects. Further, a database including tables for managing various types of data may be constructed in the storage unit 123.

The I/O interface 124 is configured to connect each of the position sensor 130, the HMD 110, and the external controller 320 to the control device 120 so as to enable communication therebetween, and is constructed of, for example, a universal serial bus (USB) terminal, a digital visual interface (DVI) terminal, or a high-definition multimedia interface (HDMI)® terminal. The control device 120 may be wirelessly connected to each of the position sensor 130, the HMD 110, and the external controller 320.

The communication interface 125 is configured to connect the control device 120 to a communication network 3, for example, a local area network (LAN), a wide area network (WAN), or the Internet. The communication interface 125 includes various wire connection terminals and various processing circuits for wireless connection for communication to/from an external device via the communication network 3, and is configured to adapt to communication standards for communication via the communication network 3.

Figure 4:
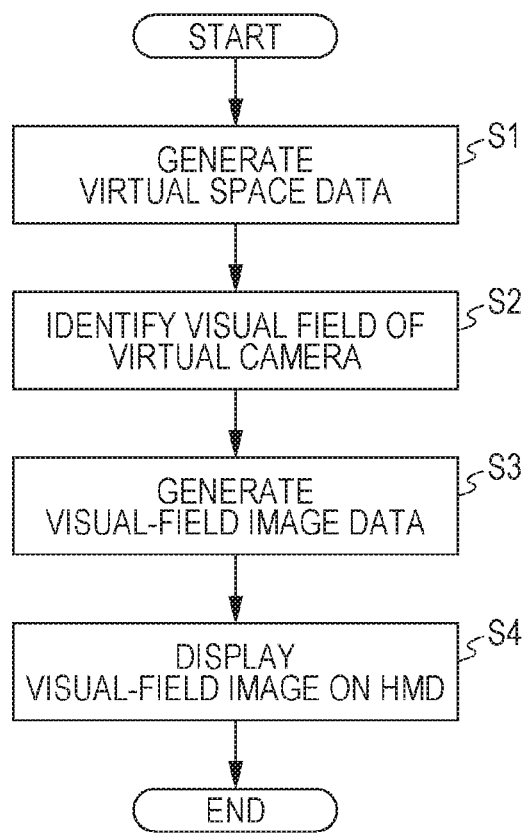
FIG. 4 A flowchart of processing of displaying a visual-field image on the HMD according to at least one embodiment of this disclosure.
Figure 5:
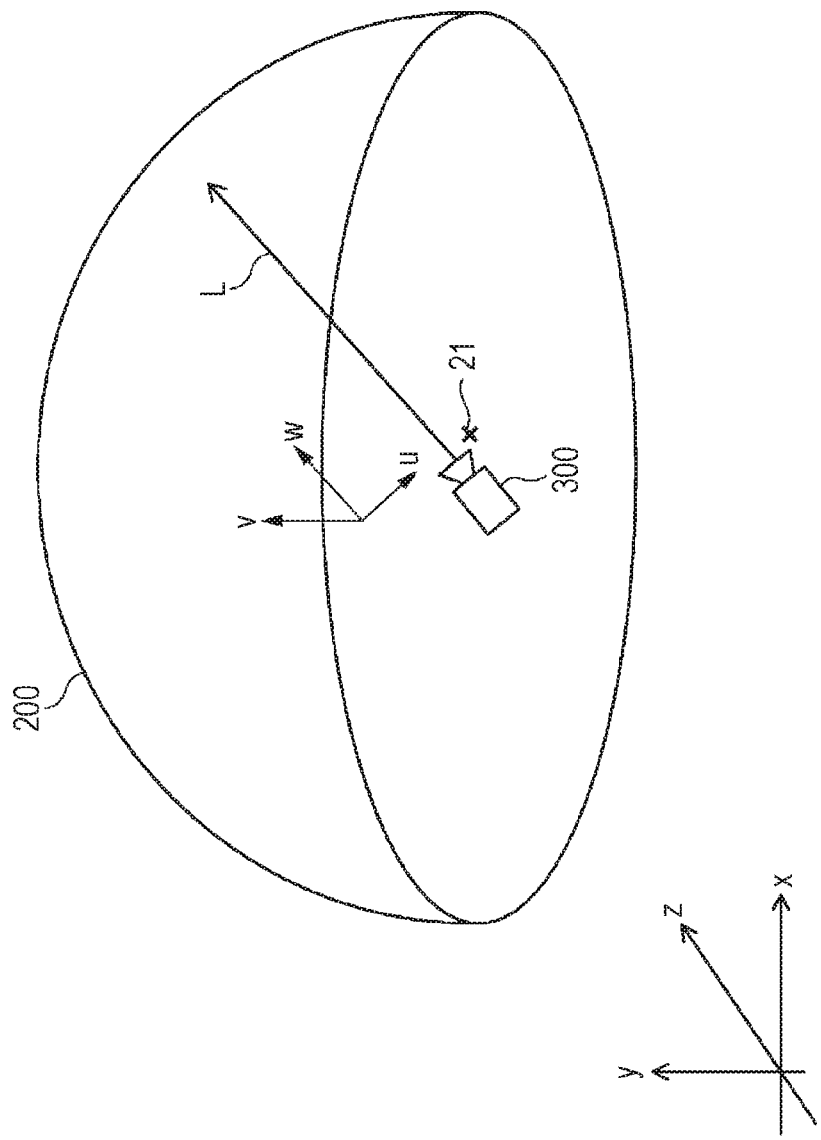
FIG. 5 An xyz spatial diagram of a virtual space according to at least one embodiment of this disclosure.
Figure 6B:
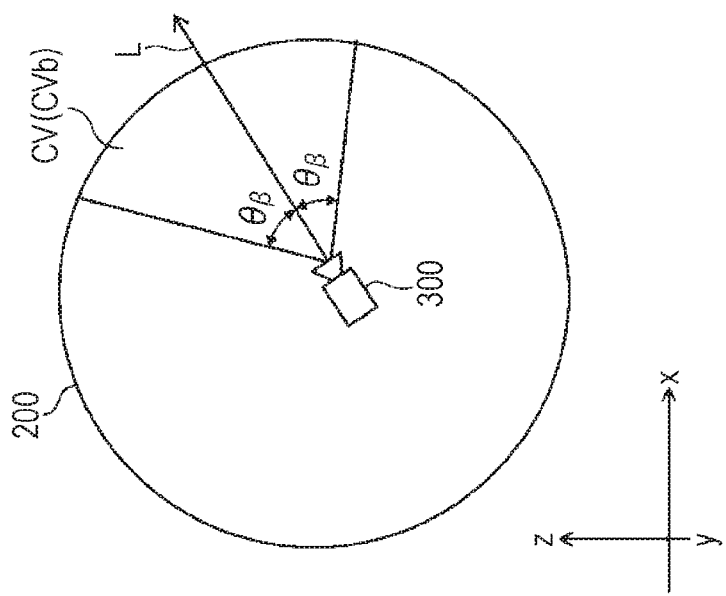
FIG. 6B A diagram of a zx plane of the virtual space in FIG. 5 according to at least one embodiment of this disclosure.
Figure 6A:
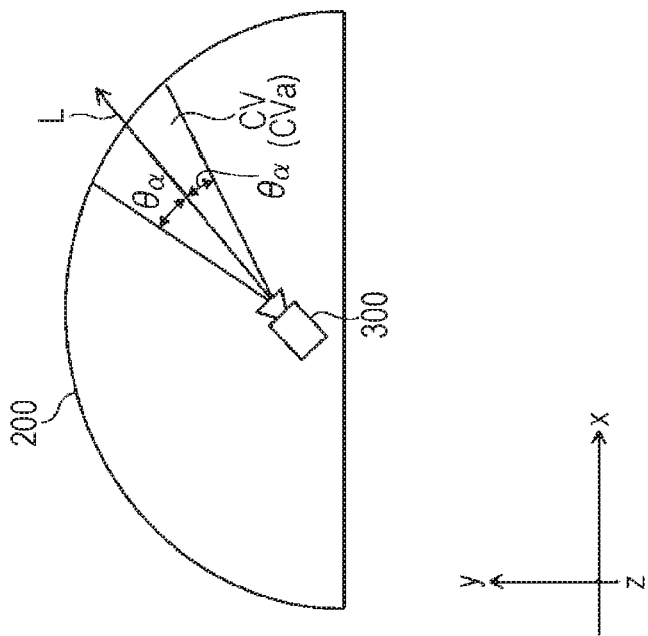
FIG. 6A A diagram of a yx plane of the virtual space in FIG. 5 according to at least one embodiment of this disclosure.

Next, with reference to FIG. 4 to FIG. 6, processing for displaying a visual-field image on the HMD 110 is described. FIG. 4 is a flow chart of the processing of displaying the visual-field image on the HMD 110 according to at least one embodiment of this disclosure. FIG. 5 is an xyz spatial diagram of an example of a virtual space 200 according to at least one embodiment of this disclosure. FIG. 6A is a yx plane diagram of the virtual space 200 in FIG. 5 according to at least one embodiment of this disclosure. FIG. 6B is a zx plane diagram of the virtual space 200 in FIG. 5 according to at least one embodiment of this disclosure.

In FIG. 4, in Step S1, the control unit 121 (refer to FIG. 3) generates virtual space data defining the virtual space 200 in which a virtual camera 300 is included. In FIG. 5 and FIGS. 6A-6B, the virtual space 200 is defined as an entire celestial sphere having a center position 21 as the center (in FIG. 5 and FIGS. 6A-6B, only upper half of celestial sphere included for simplicity). Further, in the virtual space 200, an xyz coordinate system having the center position 21 as the origin is set. In an initial state of the HMD system 1, the virtual camera 300 is arranged at the center position 21 of the virtual space 200. The uvw coordinate system that defines the visual field of the virtual camera 300 is determined so as to synchronize with the uvw coordinate system that is defined about the head of the user U in the real space. Further, the virtual camera 300 may be moved in the virtual space 200 in synchronization with the movement of the user U wearing the HMD 110 in the real space.

Next, in Step S2, the control unit 121 identifies a visual field CV (refer to FIG. 6) of the virtual camera 300. Specifically, the control unit 121 acquires information relating to the position and the inclination of the HMD 110 based on data representing the state of the HMD 110, which is transmitted from the position sensor 130 and/or the HMD sensor 114. Next, the control unit 121 determines the position and the direction of the virtual camera 300 in the virtual space 200 based on the information relating to the position and the inclination of the HMD 110. Next, the control unit 121 determines a reference line of sight L corresponding to the visual axis of the virtual camera 300 based on the position and the direction of the virtual camera 300, and identifies the visual field CV of the virtual camera 300 based on the determined reference line of sight L. In this case, the visual field CV of the virtual camera 300 matches a part of the region of the virtual space 200 that can be visually recognized by the user U wearing the HMD 110. In other words, the visual field CV matches a part of the region of the virtual space 200 to be displayed on the HMD 110. Further, the visual field CV has a first region CVa set as an angular range of a polar angle θα about the reference line of sight L in the xy plane in FIG. 6A, and a second region CVb set as an angular range of an azimuth angle θβ about the reference line of sight L in the xz plane illustrated in FIG. 6B.

As described above, the control unit 121 can identify the visual field CV of the virtual camera 300 based on the data transmitted from the position sensor 130 and/or the HMD sensor 114. In this case, when the user U wearing the HMD 110 moves, the control unit 121 can identify the visual field CV of the virtual camera 300 based on the data representing movement of the HMD 110, which is transmitted from the position sensor 130 and/or the HMD sensor 114. That is, the control unit 121 can move the visual field CV along with the movement of the HMD 110.

Next, in Step S3, the control unit 121 generates visual-field image data representing the visual-field image to be displayed on the display unit 112 of the HMD 110. Specifically, the control unit 121 generates the visual-field image data based on the virtual space data defining the virtual space 200 and the visual field CV of the virtual camera 300. That is, the visual field CV of the virtual camera 300 determines the range of virtual space data to be rendered as visual-field image data.

Next, in Step S4, the control unit 121 displays the visual-field image on the display unit 112 of the HMD 110 based on the visual-field image data. As described above, the visual field CV of the virtual camera 300 changes in accordance with the movement of the user U wearing the HMD 110, and thus a visual-field image V to be displayed on the HMD 110 changes as well. Thus, the user U can be immersed in the virtual space 200.

Figure 7:
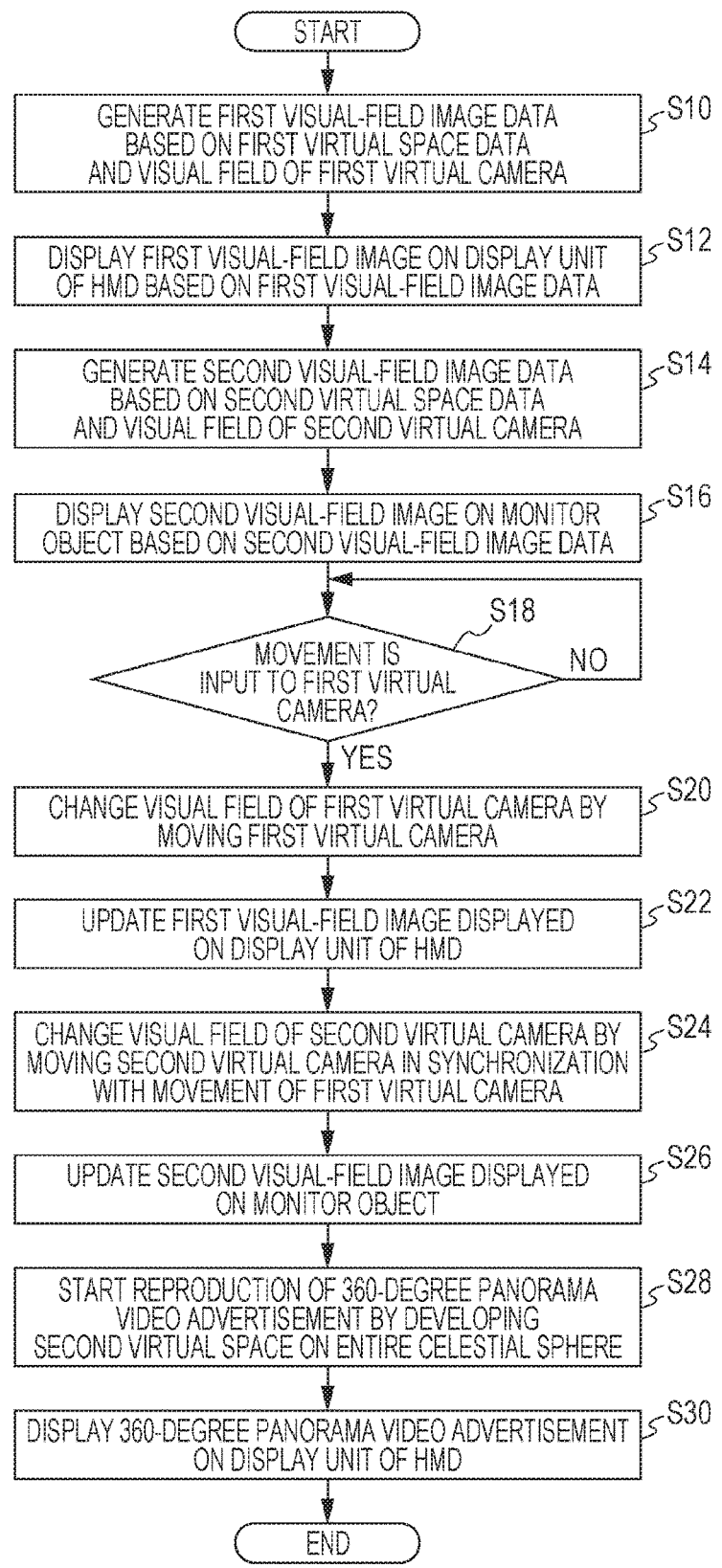
FIG. 7 A flowchart of a display control method according to at least one embodiment.
Figure 8:
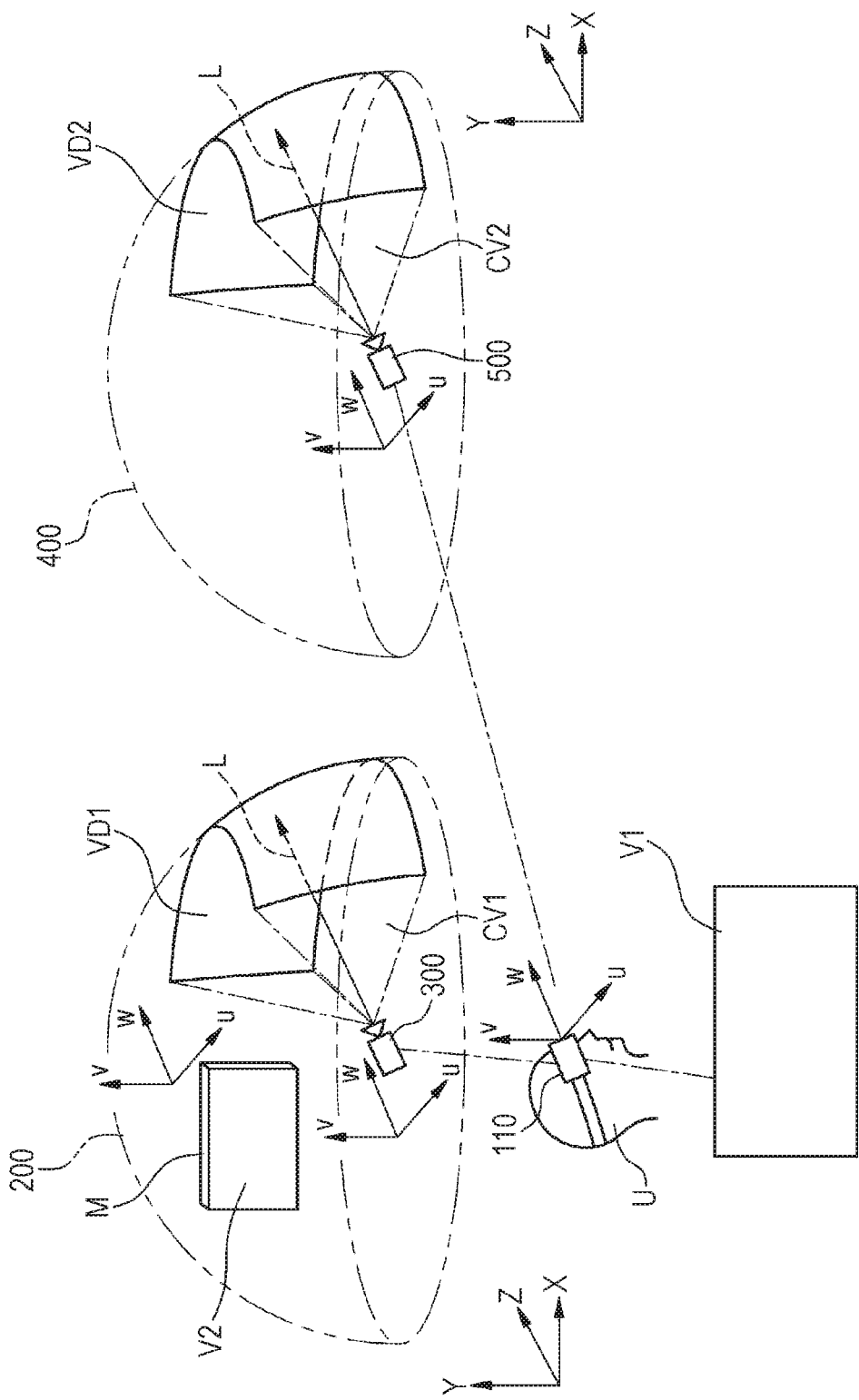
FIG. 8 A schematic diagram of the display control method according to at least one embodiment.
Figure 9:
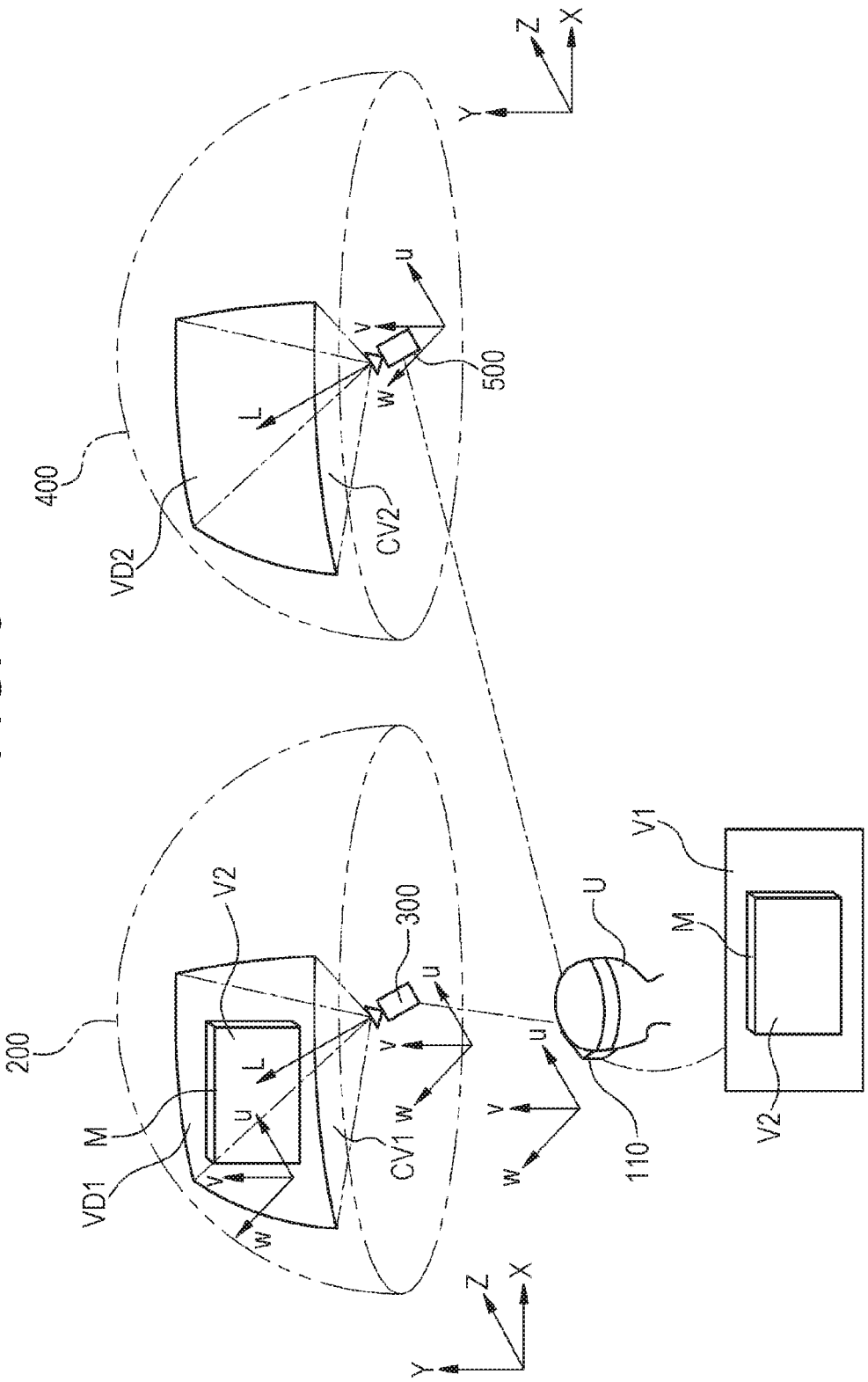
FIG. 9 A diagram of a state in which the virtual camera is moved from a position in FIG. 8 to a position at which a monitor object is included in the visual field according to at least one embodiment of this disclosure.

Next, the display control method according to at least one embodiment is described with reference to FIG. 7 to FIG. 9. FIG. 7 is a flowchart of the display control method according to at least one embodiment. FIG. 8 is a schematic diagram of the display control method according to at least one embodiment.

First, in FIG. 8, the virtual space 200 (example of first virtual space) is a space for generating a visual-field image to be displayed on the display unit 112 of the HMD 110, and includes the virtual camera 300 (example of first virtual camera) and a monitor object M (example of display object). The control unit 121 generates first virtual space data for defining the virtual space 200 including those objects.

The virtual camera 300 is associated with the HMD system 1 operated by the user U. A uvw coordinate system for defining the visual field of the virtual camera 300 is linked to a uvw coordinate system defined about the head of the user U in the real space. Specifically, the position and the direction of the virtual camera 300 (that is, visual field CV1 of virtual camera 300) are changed in accordance with movement of the HMD 110 worn by the user U.

The monitor object M is arranged at any position in the virtual space 200. The display position and the direction of the monitor object M can be changed so that the user U can easily recognize the monitor object M. In FIG. 8, the monitor object M is formed to be a rectangular parallelepiped, but the monitor object M is not limited to the rectangular parallelepiped shape in FIG. 8.

In at least one embodiment, a virtual space 400 (example of second virtual space) for generating second virtual space data associated with an image V2 to be displayed on the monitor object M of the virtual space 200 is defined separately from the virtual space 200. The virtual space 400 is a space of the entire celestial sphere, which is generated with 360-degree spatial image data photographed by the 360-degree camera (in FIG. 8, only upper half of entire celestial sphere is included for simplicity). The 360-degree spatial image data is a 360-degree panorama video advertisement for promotion of, for example, a corporation, and is stored in an advertisement information database constructed in the storage unit 123. The control unit 121 reads predetermined 360-degree spatial image data from the advertisement information database, and generates the second virtual space data for defining the virtual space 400 including a virtual camera 500. The 360-degree spatial image data may be downloaded from a computer on the communication network 3 via the communication interface 125. Similarly, in this case, the downloaded 360-degree spatial image data is stored in the storage unit 123.

The virtual space 400 includes the virtual camera 500 (example of second virtual camera). The virtual camera 500 is associated with the HMD system 1 operated by the user U similarly to the virtual camera 300. Similarly to the virtual camera 300, a uvw coordinate system for defining the visual field of the virtual camera 500 is linked to the uvw coordinate system defined about the head of the user U in the real space. Specifically, a visual field CV2 of the virtual camera 500 (that is, position and direction of virtual camera 500) in the virtual space 400 is changed in synchronization with the visual field CV1 of the virtual camera 300 based on movement of the HMD 110 worn by the user U.

First, in FIG. 7, in Step S10, the control unit 121 generates first visual-field image data VD1 based on the first virtual space data for defining the virtual space 200 and the visual field CV1 of the virtual camera 300 (refer to Step S3 of FIG. 4). Then, in Step S12, the control unit 121 displays a first visual-field image V1 on the display unit 112 of the HMD 110 based on the first visual-field image data VD1.

Next, in Step S14, the control unit 121 generates second visual-field image data VD2 based on the second virtual space data for defining the virtual space 400 and the visual field CV2 of the virtual camera 500. Then, in Step S16, the control unit 121 displays a second visual-field image V2 on the monitor object M of the virtual space 200 based on the second visual-field image data VD2.

Next, in Step S18, the control unit 121 determines whether or not the user U wearing the HMD 110 has moved, that is, whether or not movement is input to the virtual camera 300 in the virtual space 200. Then, when the control unit 121 determines that movement is input to the virtual camera 300 (Yes in Step S18), in Step S20, as in FIG. 9, the control unit 121 moves the virtual camera 300 in the virtual space 200 based on the movement input. That is, the control unit 121 changes the visual field CV1 of the virtual camera 300 in FIG. 8 and FIG. 9. Then, in Step S22, the control unit 121 updates the first visual-field image V1 displayed on the display unit 112 based on the change in visual field CV1. In FIG. 9, the direction of the virtual camera 300 is changed from the state illustrated in FIG. 8 with the position of the virtual camera 300 being fixed. However, the position of the virtual camera 300 may be moved based on movement input to the virtual camera 300.

Next, in Step S24, the control unit 121 moves the virtual camera 500 in the virtual space 400 in synchronization with movement of the virtual camera 300 in Step S20. That is, the control unit 121 changes the visual field CV2 of the virtual camera 500 in synchronization with the change in visual field CV1 of the virtual camera 300 in Step S20. Then, in Step S26, the control unit 121 updates the second visual-field image V2 displayed on the monitor object M based on the change in visual field CV2. Specifically, the positions of axes of the uvw coordinate system of the second visual-field image V2 displayed on the monitor object M are changed due to change in positions of axes of the uvw coordinate system of the virtual camera 500 from the positions in FIG. 8 to the positions in FIG. 9, which is caused by movement of the HMD 110.

Then, when the user U directs his or her line of sight to the second visual-field image V2 on the monitor object M, in Step S28, the control unit 121 develops the virtual space 400 on an entire celestial sphere (entire celestial sphere for defining visual-field image displayed on display unit 112), and starts reproduction of a 360-degree panorama video advertisement (reproduction of second virtual space data for defining virtual space 400). Then, in Step S30, the control unit 121 generates the second visual-field image data VD2, which is synchronized with movement of the HMD 110, and displays a 360-degree panorama video advertisement on the display unit 112. A gaze on the monitor object M by the user U may be detected based on the reference line of sight L of the user U or an actual line-of-sight direction. The actual line-of-sight direction of the user U may be detected by an eye gaze sensor having an eye tracking function. This eye gaze sensor may radiate, for example, an infrared light to an eye of the user U, and detect a reflected light reflected by the eye (in particular, cornea or iris), to thereby acquire information on the rotation angle of an eyeball. In this manner, the user U wearing the HMD 110 is motivated to willingly see a 360-degree panorama video advertisement by effectively providing the user U with the 360-degree panorama video advertisement on the monitor object M in the virtual space 200 as a thumbnail image.

As described above, according to at least one embodiment, the control unit 121 generates the first virtual space data for defining the virtual space 200 including the virtual camera 300 and the monitor object M, displays the first visual-field image V1 on the HMD 110 based on the visual field CV1 of the virtual camera 300 and the first virtual space data, and moves the virtual camera 300 in the virtual space 200 in synchronization with movement of the HMD 110, to thereby update the first visual-field image V1 displayed on the HMD 110. Besides, the control unit 121 generates the second virtual space data for defining the virtual space 400 including the virtual camera 500, displays the second visual-field image V2 on the monitor object M based on the visual field CV2 of the virtual camera 500 and the second virtual space data, and moves the virtual camera 500 in the virtual space 400 in synchronization with movement of the HMD 110, to thereby update the second visual-field image V2 displayed on the monitor object M. The second visual-field image V2 is an image obtained by cutting the virtual space 400, which is, for example, 360-degree image data, with the visual field CV2 of the virtual camera 500. Thus, the second visual-field image V2 displayed on the monitor object M is displayed in a manner that enables grasp of the fact that the second visual-field image V2 is a 360-degree panorama video by being updated through change in visual field CV2. Therefore, the user U can easily recognize the fact that there is a 360-degree panorama video (e.g., appealing 360-degree panorama video advertisement) in the first visual field image V1 displayed on the display unit 112 of the HMD 110.

When the monitor object M enters the visual field CV1 of the virtual camera 300, the control unit 121 may start display of the second visual-field image V2 on the monitor object M. In this manner, the data processing load can be reduced by reproducing the second visual-field image V2 on the monitor object M only when the user U can recognize the monitor object M.

Further, the control unit 121 may perform control so that, when the monitor object M enters the visual field CV1 of the virtual camera 300, the front direction of the visual field CV2 of the virtual camera 500 is included in the second visual-field image V2 displayed on the monitor object M. In this case, the "front direction of the visual field CV2" may be defined as a direction in which the user U can recognize the central region of the virtual space 400, for example, a direction in which there is a performer appearing in the 360-degree panorama video. In this manner, the 360-degree panorama video advertisement is made more appealing by, for example, starting reproduction of the 360-degree panorama video on the monitor object M from the front direction of the video.

This concludes description of at least one embodiment of this disclosure. However, the description of the at least one embodiment is not to be read as a restrictive interpretation of the technical scope of this disclosure. The at least one embodiment is merely given as an example, and it is to be understood by a person skilled in the art that various modifications can be made to the embodiments within the scope of this disclosure set forth in the appended claims. Thus, the technical scope of this disclosure is to be defined based on the scope of this disclosure set forth in the appended claims and an equivalent scope thereof.

For example, a transmissive HMD may be adopted as the HMD 110. The transmissive HMD includes the transmissive display unit 112, and enables recognition of the real space via the HMD 110 (so-called optical see-through). Further, a camera for photographing the real space may be mounted on the HMD 110 and the photographed real space image may be displayed on the non-transmissive display unit 112 so that the real space is recognized via the HMD 110 (so-called video see-through). In those cases, the visual field of the real space can be adopted as the virtual space 200, and the user is provided with a virtual experience by superimposing the second visual-field image V2 to be displayed on the monitor object M on the visual field of the real space. Further, effectively providing even the user using the transmissive HMD 110 with a 360-degree panorama video advertisement by providing the user gazing the monitor object M capable of displaying the second visual-field image V2 with the virtual space 400 is possible.

In order to implement various types of processing to be executed by the control unit 121 by software, a display control system for executing a display control method according to at least one embodiment including instructions that may be installed in advance into the storage unit 123 or the ROM. Alternatively, instructions for the display control system may be stored in a computer-readable storage medium, for example, a magnetic disk (HDD, or floppy disk), an optical disc (e.g., CD-ROM, DVD-ROM, or Blu-ray disc), a magneto-optical disk (e.g., MO), and a flash memory (e.g., SD card, USB memory, and SSD). In this case, the storage medium is connected to the control device 120, and thus the program stored in the storage medium is installed into the storage unit 123. Then, the instructions for the display control system installed in the storage unit 123 is loaded onto the RAM, and the processor executes the loaded instructions. In this manner, the control unit 121 executes the display control method according to at least one embodiment.

Further, the display control program may be downloaded from a computer on the communication network 3 via the communication interface 125. Also in this case, the downloaded program is similarly installed into the storage unit 123.

The invention claimed is:

1. A display control method comprising:
   generating first virtual space data for defining a first virtual space including a first virtual camera and a display object;
   displaying a first visual-field image on a head-mounted display based on a visual field of the first virtual camera and the first virtual space data;
   updating the first visual-field image by moving the first virtual camera in the first virtual space in synchronization with detected movement of the head-mounted display;
   generating second virtual space data for defining a second virtual space including a second virtual camera different from the first virtual camera;
   displaying a second visual-field image on the display object in the first virtual space based on a visual field of the second virtual camera and the second virtual space data; and
   updating the second visual-field image by moving the second virtual camera in the second virtual space in synchronization with the detected movement of the head-mounted display,
   wherein the generating of the second virtual space data is performed in response to the display object entering the visual field of the first virtual camera.

2. The display control method according to claim 1, further comprising starting display of the second visual-field image on the display object in response to the display object entering the visual field of the first virtual camera.

3. The display control method of claim 2, wherein the starting display of the second visual-field image comprises displaying a panoramic video advertisement on the head-mounted display.

4. The display control method of claim 2, further comprising determining the visual field of the first virtual camera based on a detected line of sight of a user of the head-mounted display.

5. The display control method according to claim 1, wherein the generating of the second virtual space data comprises defining a front direction of the visual field of the second virtual camera in the second visual-field image displayed on the display object in response to the display object entering the visual field of the first virtual camera.

6. The display control method of claim 5, wherein defining the front direction comprises defining the front direction as a direction from the second virtual camera to a central region of the second visual-field image.

7. The display control method of claim 1, further comprising changing the visual field of the second camera in synchronization with movement of the first virtual camera.

8. The display control method of claim 1, wherein the generating of the first virtual space data comprises generating the display object as a representation of a video advertisement.

9. A display control method comprising:
   generating first virtual space data for defining a first virtual space including a first virtual camera and a display object;
   displaying a first visual-field image on a head-mounted display based on a visual field of the first virtual camera and the first virtual space data;
   updating the first visual-field image by moving the first virtual camera in the first virtual space in synchronization with a detected movement of the head-mounted display; and
   displaying a second visual-field image different from the first visual-field image on the display object,
   wherein the second visual-field image is a 360-degree panorama video, and
   wherein the displaying of the second visual-field image is performed in response to the display object entering the first visual-field image.

10. The display control method of claim 9, wherein the displaying of the second visual-field image comprises starting displaying of the second visual-field image in response to the display object entering the first visual-field image.

11. The display control method of claim 9, wherein the displaying of the first visual-field image comprises defining the visual field based on a detected line of sight of a user of the head-mounted display.

12. The display control method of claim 9, wherein the displaying of the second visual-field image comprises starting displaying of the second visual-field image in response to a detected line of sight of a user of the head-mounted display intersecting with the display object.

13. The display control method of claim 9, wherein the generating of the first virtual space data comprises generating the display object as a representation of a video advertisement.

14. A system for executing a display control method, the system comprising:
   a head-mounted display; and
   a controller, wherein the controller comprises:
      a non-transitory computer readable medium for storing instructions; and
      a processor connected to the non-transitory computer readable medium, wherein the processor is configured to execute the stored instructions for:
         generating first virtual space data for defining a first virtual space including a first virtual camera and a display object;
         instructing the head-mounted display for displaying a first visual-field image based on a visual field of the first virtual camera and the first virtual space data;
         updating the first visual-field image by moving the first virtual camera in the first virtual space in synchronization with detected movement of the head-mounted display;
         generating second virtual space data for defining a second virtual space including a second virtual camera different from the first virtual camera;
         instructing the head-mounted display for displaying a second visual-field image on the display object in the first virtual space based on a visual field of the second virtual camera and the second virtual space data; and
         updating the second visual-field image by moving the second virtual camera in the second virtual space in synchronization with the detected movement of the head-mounted display, wherein (i) the generating of the second virtual space data or (ii) the instructing the head-mounted display for displaying the second visual-field image on the display object is performed in response to the display object entering the visual field of the first virtual camera.

15. The system according to claim 14, wherein the processor is further configured to execute the stored instructions for: instructing the head-mounted display for starting display of the second visual-field image on the display object in response to the display object entering the visual field of the first virtual camera.

16. The system of claim 15, wherein the processor is further configured to execute the stored instructions for: starting display of the second visual-field image by displaying a panoramic video advertisement on the head-mounted display.

17. The system according to claim 14, wherein the processor is further configured to execute the stored instructions for: generating of the second virtual space data by defining a front direction of the visual field of the second virtual camera in the second visual-field image displayed on the display object in response to the display object entering the visual field of the first virtual camera.

18. The system of claim 17, wherein the processor is further configured to execute the stored instructions for: defining the front direction by defining the front direction as a direction from the second virtual camera to a central region of the second visual-field image.

19. The system of claim 14, wherein the processor is further configured to execute the stored instructions for: changing the visual field of the second camera in synchronization with movement of the first virtual camera.

20. The system of claim 14, wherein the processor is further configured to execute the stored instructions for: generating the first virtual space data by generating the display object as a representation of a video advertisement.

* * * * *